United States Patent [19]

Harrington

[11] Patent Number: 5,543,935
[45] Date of Patent: Aug. 6, 1996

[54] HALFTONING METHOD USING SPACE FILLING CURVES

[75] Inventor: Steven J. Harrington, Holley, N.Y.

[73] Assignee: Xerox Corporation, Stamford, Conn.

[21] Appl. No.: 342,064

[22] Filed: Nov. 18, 1994

[51] Int. Cl.$^6$ .............................. H04N 1/41; H04N 1/40
[52] U.S. Cl. .................... 358/429; 358/456; 358/298
[58] Field of Search ................................. 358/429, 448, 358/456, 457, 459, 460, 465, 298; 341/97, 102, 106; 395/27; H04N 1/41, 1/40

[56] References Cited

U.S. PATENT DOCUMENTS

| | | | |
|---|---|---|---|
| 3,849,592 | 11/1974 | Rosenheck | 358/429 |
| 4,149,194 | 4/1979 | Holladay | 358/283 |
| 4,339,774 | 7/1982 | Temple | 358/283 |
| 4,879,595 | 11/1989 | Hiroshi | 358/539 |
| 4,903,147 | 2/1990 | Yoshimitsu | 358/448 |
| 4,924,322 | 5/1990 | Kurosawa et al. | 358/448 |
| 4,955,065 | 9/1990 | Ulichney | 382/50 |
| 5,045,952 | 9/1991 | Eschbach | 358/447 |
| 5,163,122 | 11/1992 | Urabe | 395/109 |
| 5,226,094 | 7/1993 | Eschbach | 382/41 |

OTHER PUBLICATIONS

An Adaptive Algorithm for Spatial Greyscale, Floyd & Steinberg, Proceedings of the SID, 17/2, 75–77 (1976).
A Survey of Techniques for the Display of Continuous Tone Pictures on Bilevel Displays, Jarvis et al., Computer Graphics and Image Processing, vol. 5, pp. 13–40 (1976).
MECCA–A Multiple–Error Correction Computation Algorithm for Bi–Level Image Hardcopy Reproduction, Stucki, IBM Research RZ 1060 (1981).
Witten et al; "Using Peano Curves for BiLevel Display of Continuous–Tone Images"; IEEE Comp. Grah. and Appl., vol. 2, No. 5, pp. 47–52 (1982).
A. J. Cole; "Naive Halftoning"; Proceedings of CGI '91, Springer Verlag; pp. 203–222 (1990).
Wyvill et al; "Three Plus Five Makes Eight: A Simplified Approach to Halftoning"; Proceedings of CGI '91 Scientific Visualization of Physical Phenomena; pp. 379–392; (1991).
Velho et al.; "Digital Halftoning with Space Filling Curves"; Computer Graphics, vol. 25, No. 4, Jul. 1991; pp. 81–90.

Primary Examiner—Kim Yen Vu
Assistant Examiner—Madeleine A-V. Nguyen
Attorney, Agent, or Firm—Mark Costello

[57] ABSTRACT

An image processing system for preparing a document image for printing, each discrete area or pixel in the image described by a signal having a number of possible states greater than can be rendered by a selected printer. In such a system a screening pattern is used which distributes screen values through the image in accordance with the pattern of a space filling curve. Each signal is thresholded against a threshold determined by such ordering and output a signal renderable by the selected printer. A straight forward function relates threshold value in a screen matrix of values and the length of a space filling curve at any point in an image. The nature of certain space filling curves, allows the generation of two reasonably sized lookup tables providing the length of the curve at any point on the page.

10 Claims, 5 Drawing Sheets

| 20 | 55 | 160 | 195 | 90 | 125 | 230 | 20 |
| --- | --- | --- | --- | --- | --- | --- | --- |
| 230 | 90 | 125 | 230 | 55 | 160 | 195 | 55 |
| 195 | 160 | 55 | 20 | 20 | 230 | 125 | 90 |
| 90 | 125 | 90 | 125 | 160 | 195 | 160 | 195 |
| 55 | 195 | 160 | 125 | 160 | 125 | 90 | 230 |
| 20 | 230 | 55 | 90 | 195 | 230 | 55 | 20 |
| 55 | 90 | 20 | 230 | 55 | 20 | 195 | 230 |
| 20 | 125 | 160 | 195 | 90 | 125 | 160 | 20 |

HALFTONING METHOD USING SPACE FILLING CURVES

This invention relates to quantization or halftoning in documents to be printed, and more particularly to a method of halftoning using space filling curves to prevent formation of artifacts in document reproduction.

BACKGROUND OF THE INVENTION

In the digital reproduction of documents, image information, be it color, black or white, is commonly generated in a bitmap format where the bitmap comprises a plurality of continuous tone or gray level pixels, i.e. pixels that are defined by digital values, each value representing a gray level among a number of gray levels. Thus, in an 8 bit system, 256 levels of gray are present, where each level represents an increment of gray between black and white. In the case of color bitmaps, where three defining colors or separations each include 256 levels of information, there may be more than 16 million colors defined by a gray bitmap.

Usually, bitmaps in such a gray level format are unprintable by standard printers. Standard printers print in a limited number of levels, either a spot or a no spot in the binary case, or a limited number of levels associated with the spot, for example, four in the quaternary case. Accordingly, it is necessary to reduce or quantize the gray level image data to a limited number of levels so that it is printable. Besides gray level information derived by scanning, certain processing techniques such as those described, for example, in U.S. Pat. No. 5,226,094 to Eschbach may produce gray level data requiring quantization for printing.

One standard method of quantizing gray level pixel values to binary level pixel values is through the use of dithering or screening processes. In such arrangements, over a given area having a number of gray pixels therein, each pixel value of an array of gray level pixels within the area is compared to one of a set of preselected thresholds (the thresholds are stored as a screen matrix and the repetitive pattern generated by this matrix is considered a screen cell) as taught, for example, in U.S. Pat. No. 4,149,194 to Holladay. The effect of such an arrangement is that, for an area where the image is gray, some of the thresholds within the screen matrix will be exceeded, i.e. the image value at that specific location is larger than the value stored in the dither matrix for that same location, while others are not. In the binary case, the pixels or cell elements for which the thresholds are exceeded might be printed as black, while the remaining elements are allowed to remain white, dependent on the actual physical quantity described by the data. The effect of the distribution of black and white over the halftone cell is integrated by the human eye as gray. A trade off is required between the number of gray level increments representable by a screen cell, versus the size or frequency of the cell. While it is desirable to have as many gray levels as possible representable by a screen cell, such a requirements increases the size of the cell until its repetition across an image becomes visible. However, with a smaller cell, which can be repeated at high frequency across a page, only a relatively small number of gray levels can be represented.

Algorithms that convert gray images to binary or other number of level images without repeating patterns exist, and include among them error diffusion, as taught, for example, in "An Adaptive Algorithm for Spatial Greyscale" by Floyd and Steinberg, Proceedings of the SID 17/2, 75–77 (1976) (hereinafter, "Floyd and Steinberg"). Error diffusion attempts to maintain image density by making the conversion from gray pixels to binary or other level pixels on a pixel-by-pixel basis. The procedure examines each pixel with respect to a threshold, and the difference between the gray level pixel value and the output value is forwarded to a selected group or set of neighboring pixels, in accordance with a weighting scheme. Another, more elaborate method would be the error diffusion techniques of U.S. Pat. No. 5,045,952 to Eschbach, which serves to provide image dependent edge enhancement. Additional modifications to the error diffusion algorithm taught by Floyd and Steinberg have been proposed, e.g.: a different weighting matrix, as taught, for example, in "A Survey of Techniques for the Display of Continuous Tone Pictures on Bilevel Displays" by Jarvis et al., Computer Graphics and Image Processing, Vol. 5., pp. 13–40 (1976) (hereinafter, Jarvis), and in "MECCA—A Multiple-Error Correction Computation Algorithm for Bi-Level Image Hardcopy Reproduction" by Stucki, IBM Res. Rep. RZ1060 (1981) (hereinafter, Stucki). Modifications of the error calculation and weight allocation have been taught, for example, in U.S. patent application Ser. No. 07/672,987 (with a counterpart application published in Japan at JP-A14-328957), entitled "Method for Image Conversion with Application of Multiple Error Diffusion Matrices", by Eschbach, U.S. Pat. No. 4,924,322 to Kurosawa et. al., U.S. 4,339,774 to Temple, U.S. Pat. No. 4,955,065, to Ulichney and U.S. patent application Ser. No. 08/167,758 by Shiau et al. Error diffusion tends to suffer from a characteristic "worming" defect.

One method of reducing the worming artifact in an error diffusion process that has been noted is to distribute error along a space filling curve, such as Hilbert, Peano or Murray Curves. See, for example, "Using Peano Curves for Bilevel Display of Continuous-Tone images", by Witten et al., IEEE Comp. Grah. and App. Vol. 2, No. 5, pp 47–52 (1982); "Naive Halftoning" by A. J. Cole, Proceedings of CGI '90, Springer Verlag pp. 203–222 (1990); and "Three Plus Five Makes Eight: A Simplified Approach to Halftoning" by Wyvill et al., Proceedings of CGI '91 Scientific Visualiation of Physical Phenomena pp. 379–392 (1991). Unfortunately, space filling curves presents complex processing order, see, for example, "Digital Halftoning with Space Filling Curves," by L. Velho et al., Computer Graphics, vol. 25, No. 4, pp. 81–90 (1991) while, in view of the operation of printers and most image processors, it would be highly desirable to work in scan line order.

Error diffusion is often unusable by certain reproduction processes, such as electrophotography, because it tends to produce isolated single spots that are not reproducible. In such cases, screening is used with threshold sets arranged to cluster spots together into larger printable dots. Error diffusion is also an inherently sequential process that does not lend itself to parallel processing, while screening.

All of the references cited herein are incorporated by reference for their teachings.

SUMMARY OF THE INVENTION

In accordance with the invention, there is provided a method of preparing a document for printing, in which a screen cell is used which operates on an image in an order determined by a space filling curve.

In accordance with one aspect of the invention, there is provided an image processing system for preparing a document for printing, each discrete area or pixel in the image described by a signal having a number of possible states greater than can be rendered by a selected printer. In such a system a screening pattern is used which distributes screen values through the image in accordance with the pattern of a space filling curve. Each signal is thresholded against a threshold determined by such ordering and output a signal renderable by the selected printer.

In accordance with another aspect of the invention, a straight forward function relates threshold value in a screen matrix of values and the length of a space filling curve at any point in an image. The nature of certain space filling curves allows the generation of two reasonably sized lookup tables providing the length of the curve at any point on the page.

The present invention provides improved image quantization by extending screening techniques to utilize space filling curves. By using a screen pattern, the method provides dot clustering and the potential of parallel processing, and processing in scan line order. From the use of space filling curve processing commonly used with error diffusion, it obtains aperiodic structure, immunity from moiré patterns and the ability to support large number of intensity levels without corresponding visible patterns.

This imaging technique offers many advantages over conventional halftoning and error diffusion methods. It allows a large number of thresholds which eliminates false contouring without generating regular patterns. Its aperiodic behavior makes it less sensitive to the moiré patterns that arise when printing transformed halftoned data such as when printing scanned binary images or during resolution conversion. This also supports the association of different halftones with different objects since it avoids moiré patterns where two halftone styles meet and similarly it can support high frequency halftones for object edges and lower frequency for interiors.

These and other aspects of the invention will become apparent from the following descriptions to illustrate a preferred embodiment of the invention read in conjunction with the accompanying drawings in which.

Figure 1:
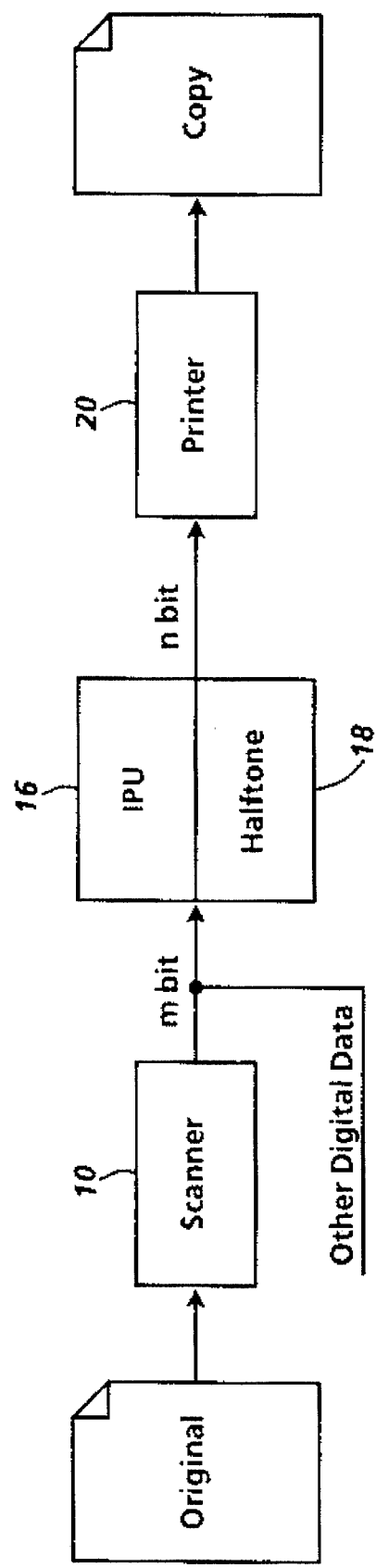
FIG. 1 is a simplified description of a digital printer in which the present invention may find advantageous use.

Referring now to the drawings where the showings are for the purpose of describing an embodiment of the invention and not for limiting same, a basic image processing system is shown in FIG. 1. In the present case, continuous tone or contone image data may be characterized as image signals, each pixel of which is defined at a single level or optical density in a set of 'c' optical density levels, the number of members in the set of levels being larger than desired. Each pixel will be processed in the manner described hereinbelow, to redefine each pixel in terms of a new, smaller set of 'd' levels. In this process, 'c' and 'd' are integer values representing pixel depth, or a number of signal levels at which the pixel may appear. One common case of this method includes the conversion of data from a relatively large set of contone levels to one of two legal or allowed binary levels for printing in a binary printer. We will use the term "halftone" here to refer any method of processing image data initially defined at 'c' optical density levels to a new, smaller set of 'd' levels.

As used herein, the term "dot" refers to a product or an image resulting from a screening process. A "screen cell", as used herein, refers to the set of pixels which together will form the dot, while the term "screen matrix" will be used to describe the set of values which together make up the set of threshold to be applied. A "pixel" refers to an image signal associated with a particular position in an image, having a density between white and black. Accordingly, pixels are defined by intensity and position. A dot is made up of a plurality of pixels. While printers print pixels (sometimes referred to as "spots") screening methods sometime cluster the pixels together into a dot. Dots of clustered pixels have better reproduction characteristics on some printing hardware than dots of unclustered pixels.

In the particular system to be discussed, documents are represented by a set of image signals. A "color image" is a document including at least two separations of image signals, each set (or separation) represented by an independent channel, which is usually processed independently. Each set of signals or separation is used to drive the printer to reproduce in an image, perhaps with different colorants, so that a final image which may comprise multiple separations superposed, can be obtained.

With reference now to FIG. 1, which shows a general system requirement representing the goal of the invention, an electronic representation of a document (hereinafter, an image) from image input terminal such as scanner 10 derives electronic digital data in some manner, in a format related to the physical characteristics of the device, and commonly with pixels defined at c bits per pixel. Common scanners, such, for example, the Pixelcraft 7650, produce 8 bit/pixel data, at resolutions acceptable for many purposes. Color images may be defined by a plurality of bitmaps. The electronic image signals are directed through an image processing unit (IPU) 16 to be processed so that an image suitable for reproduction on image output terminal or printer 20 is obtained. Image processing unit 16 commonly includes a halftone processor 18 which converts c bit digital image signals to d bit digital image signals, suitable for driving a particular printer, where c and d are integer values greater than 1.

Figure 2:
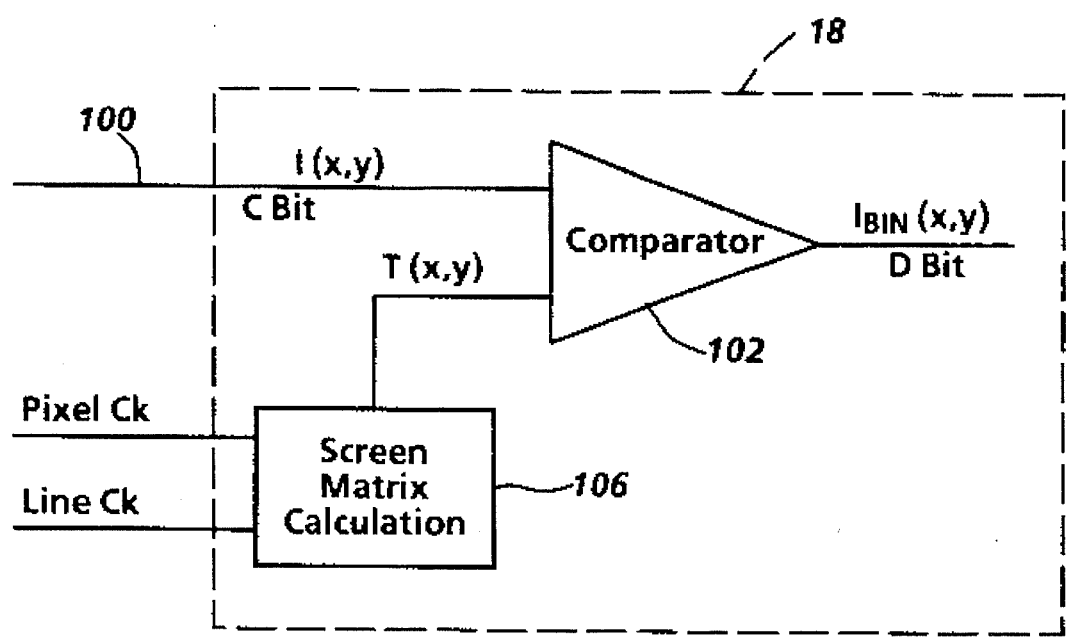
FIG. 2 is a schematic block diagram of a halftoning circuit in which the invention is implemented.

FIG. 2 shows halftone processor 18 operational characteristics. A set of continuous tone signals I(x,y) are obtained, at an input 100 to screening processor 102 (here a comparator), to be processed for screening purposes to reduce an c-bit input to an d-bit output, where x and y represent two dimensional position on a page. A screen matrix (a set of threshold values), is generated at screen matrix calculator 106, which, for a given gray level reproduces a periodic dot pattern. While screening may be described for simplicity as the addition of a set of selected screen values to image signals within a defined area of the image, in conjunction with a uniform application of a threshold level(s) to the combined values, it will be understood that the process of screening may also be represented by a set of varying thresholds defined at locations corresponding to pixels over a given area of the image. A screen cell is generally smaller than the total image and will be replicated in a predetermined scheme for processing the image in order to cover an area of the image. The output of a process using a screen cell is a set of pixels, defined by a set of levels having a number of members less than the input set of values. Commonly, the set of d-bit output values is binary, either black or white, or a spot or no spot, although the values might be gray. The binary output of a single halftone cell is a set of pixels that are either black or white, which together form a "dot". The screening processor 102 returns an n bit value representing the separation.

In accordance with a standard halftoning technique, a linear halftone cell is generated in screen matrix calculator 106 (for example, see U.S. Pat. No. 4,149,194 to Holladay), which is essentially an ordered list of potential threshold values. During the halftoning process, the intensity values of the image I(x,y) will be compared to the threshold values to determine if a corresponding spot should be black or white. The following example screen or matrix set S is provided:

{20, 55, 90, 235, 260, 195, 230}

Figures 4A, 4B:
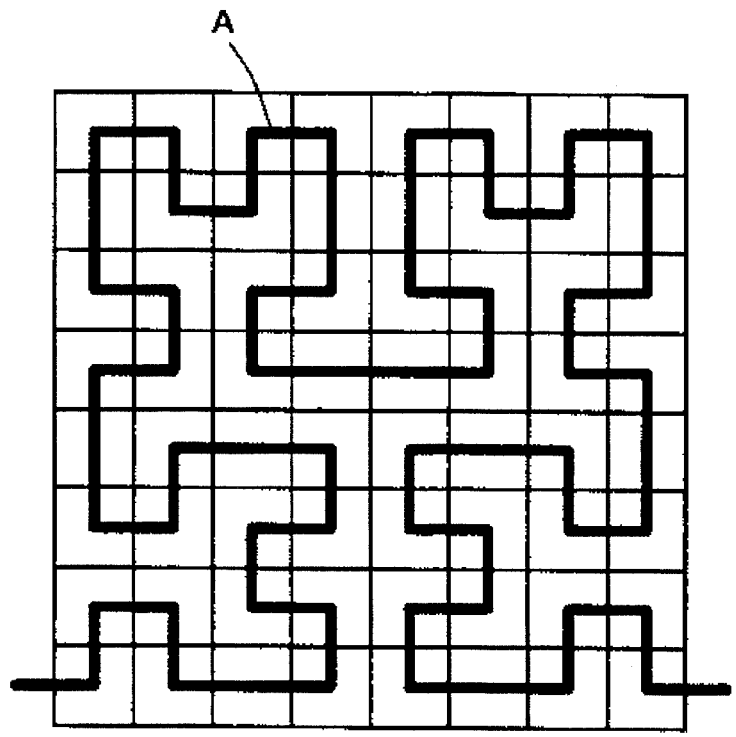
FIGS. 4A and 4B show a space filling path through an image area, and a set of halftone thresholds derived.
Figure 5A:
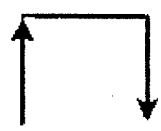
FIGS. 5A–5D show each of four possible elements of a space filling curve.
Figure 5B:
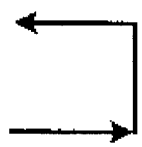
Figure 5C:
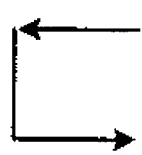
Figure 5D:
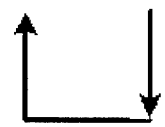
Figure 6A:
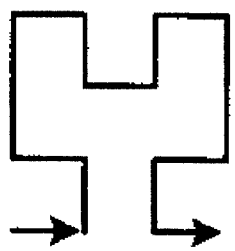
FIGS. 6A–6D show possible expansions of the elements of FIGS. 5A–5D.
Figure 6B:
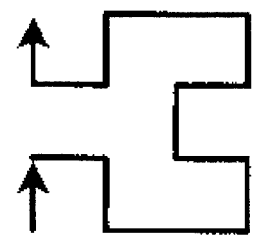
Figure 6C:
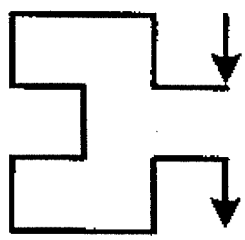
Figure 6D:
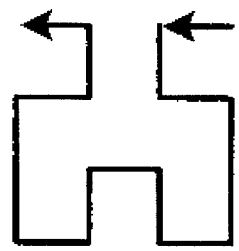

In accordance with the invention, this linear cell is mapped to a space filling curve, which is designed to visit each cell in a selected area. The linear cell is repeated as necessary to cover the length of the curve. Image intensity of each pixel will be compared to the mapped threshold values to determine a binary image. With reference to FIG. 4A, a space filling curve A for an 8×8 pixel area of the image is illustrated. Using the screen matrix S, the threshold assignments of FIG. 4B are obtained.

However, the processing order is not yet determined. Again, a scan line processing order is preferred (for example, (1, m) . . . (n,m), (1, m+1) . . . (n+1, m+1)). Scan line processing can be obtained if the function L(x,y) can be easily calculated for a pixel position (x,y) to obtain a length along the space filling curve at which the pixel is encountered. If the screen matrix contents include thresholds $\{T_0 \ldots T_{M-1}\}$ where M is the number of thresholds in the cell, then the threshold to use at position (x,y) is TL(x,y)mod M. One can, in fact, define a new function R(x,y)=L(x,y) mod M, and then the threshold is given more simply by $T_{R(x,y)}$. Given the ability to find the threshold for any arbitrary pixel based on a calculated length of the space filling curve from its starting point to the the pixel under consideration in terms of pixel equivalents, one can consider the pixel in scan line order, determine intensity at the pixel and threshold the pixel against a threshold value determined as a function of the space filling curve to decide if the pixel should be black or white.

While R(x,y) can be determined, it must also be determined quickly. Taking a Hilbert curve (shown, for example, in FIG. 4A), a table can be precomputed containing the values of R(x,y) for all x,y, and then be looking up the desired value in the table, the screen matrix value for that pixel position would be obtained. Such a table, would, however, be larger than one might like. It would require an entry for every pixel on the page, or typically over 10 million entries. However, the nature of a Hilbert curve allows the use of two small tables instead of one large table. Thresholds for an image up to a size of 4096 pixels by 4096 pixels can be determined from two tables, each with 4096 entries, which is quite practical.

With reference to FIGS. 5A–5D, it can be seen that a Hilbert curve is based on a three-sided unit (sides a, b and c) with four orientations. It is recursively constructed by replacing these units with expanded versions constructed from the elements of FIG. 5A–5D, as illustrated in FIG. 6A–6D. Thus, a Hilbert curve covering a 4096×4096 can be constructed by first constructing a Hilbert curve covering a 64×64 area, and then expanding each cell in the curve into a 64×64 area at one of four orientations. The length of the curve at any point on the curve is equal to:

the length along the unexpanded curve×4096+the length of the expanded section containing the point The length is given by the value in a table of the unexpanded curve, indexed by the high order six bits of the x and y coordinates, plus the value from a table for the expanded portion of the curve, indexed by the low order six bits of the x and y coordinates, after transforming to achieve the proper orientation. The needed transformation can be included as an additional entry in the table for the unexpanded curve.

Figure 3:
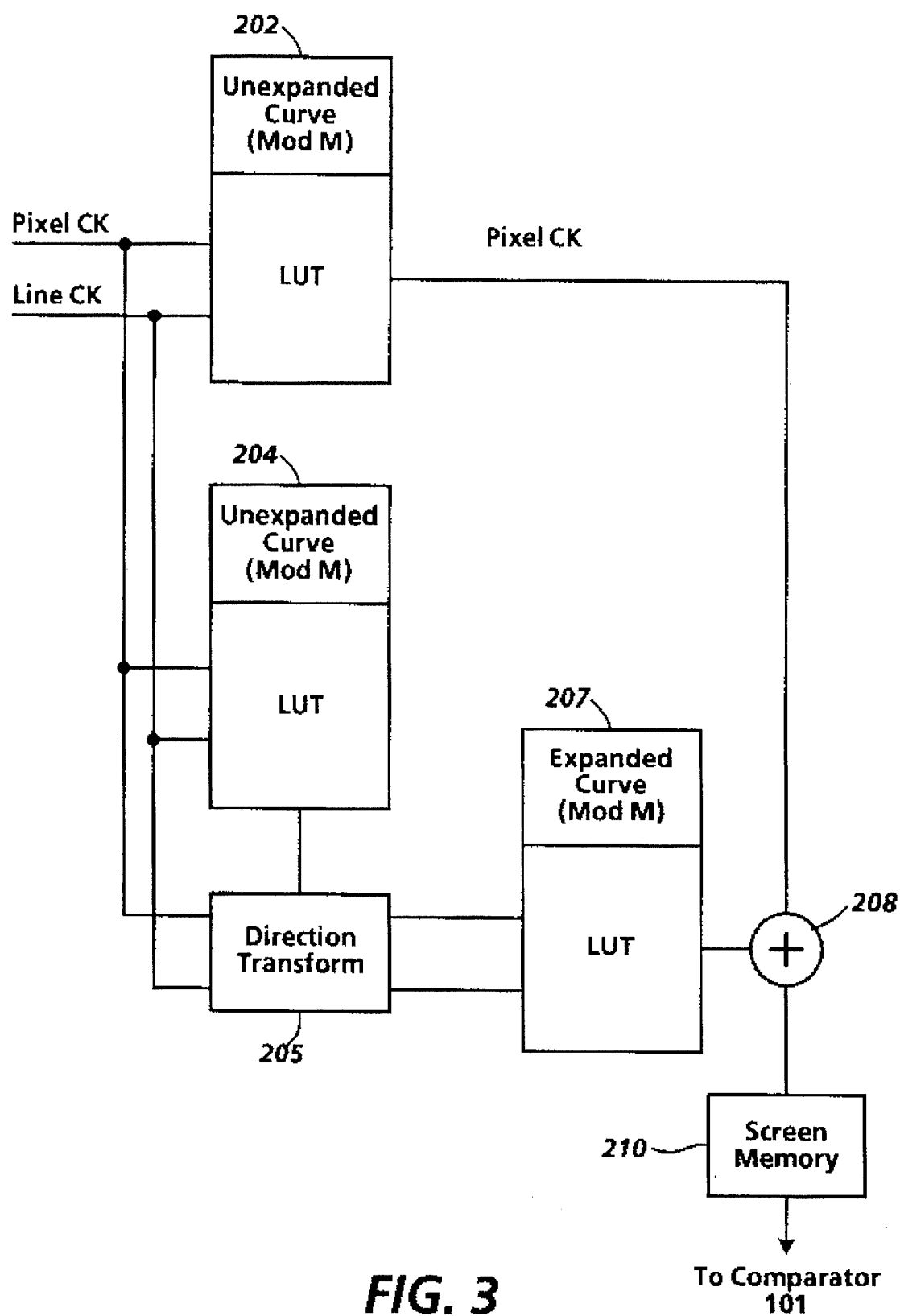
FIG. 3 shows a further detail of an implementation of the invention.

FIG. 3 illustrates a possible embodiment of the invention. Look up table 202 stores scaled values for the length along the unexpanded curve indexed by pixel clock and scan line clock values, where the scale factor is a function of the screen size. It stores these values Mod m, or truncated. Lookup table 204 stores a direction index, indicating the direction or orientation of the sub-element in which the pixel is included. A direction transformation 205 rotates the orientation of the stored direction value into a normalized one, for use as an address to look up table 207, which stores values for the expanded length of the curve, mod M. Conveniently, the tables may be stored in RAM or ROM like memories.

At signal adder 208, the value from table 202 and the value obtained from table 207 are added together, to give a length signal corresponding to the length of the space filling curve at that point. That length signal is used as a index value for the screen memory 210, conveniently, stored in RAM or ROM like memories. From screen memory 210 a threshold value T(x,y) is obtained for any signals I(x,y).

The following pseudo code program provides one possible example of a length calculation:

```
L=unexpLen [x>>6] [y>>6]
switch (direction [X>>6] [y>>6])
{case 0:    x&=0x3F; y&=0x3F; break;
 case 1:    t=x; x=y&0x3F; y=t&0x3F; break;
 case 2:    t=x; x=64−(y&0x3F); y=64−(t&0x3F); break;
 case 3:    x=64−(x&0x3F); y=64−(y&0x3F); break;
}
L+=expLen[X][y];
```

In this code fragment the table unexpLen gives the length from the unexpanded curve contribution, direction gives a value between 0 and 3 indicating the direction of the expanded portion, and expLen gives the length contribution from the expanded section of the curve.

For the halftoning application one does not need the length, but the length modulo the size of the halftone cell. The length modulo the cell size is stored in the array instead of the full lengths. The result will then be a number between 0 and 2M-2 where M is the halftone cell size. An additional remainder calculation can be avoided when actually halftoning by repeating the halftone cell to cover this many threshold entries.

Further optimization is possible when processing in scan line order. One will then step through the elements in sequence and new x, y values can be calculated incrementally from the old. The direction processing becomes the selection of the appropriate increments. Note also that the lookup in the unexpanded tables for length and direction need only be done for every 64 pixels, since these values will not change when stepping across the expanded area.

The halftone cell is a linear array of thresholds. The properties of the space-filling curve insure that two nearby thresholds will be nearby in space. Thus, a ramp of thresholds will form clustered dot shapes, although the actual shapes of the dots will vary. Yet, there is no reason why there must be a single monotonic ramp of thresholds in the cell.

The cell might contain several small ramps giving a cluster size smaller than the halftone cell size. This is the analog to the "superdots" of conventional halftoning, except in this case the size of the super dot is not limited by the appearance of visible patterns.

One can also define a halftone cell where thresholds are dispersed as much as possible. This is the analog of a conventional dispersed halftone dot. This structure may be used as an alternative to the dispersed dot or to error diffusion on devices such as CRT's and ink jet printers which do not require clustered dots.

The method may be less sensitive to printer noise than conventional halftoning. The halftone dot is most sensitive at the size when it just touches its neighbors. In a conventional scheme all dots touch their neighbors at the same intensity level making this level extremely sensitive to process noise. While in the scheme described the connection of dots is spread out over many levels so that no single level is particularly sensitive.

The method can be used in color image printing and avoids the need for rotated screens or bricked halftones since a simple shift of the screen is sufficient to avoid moire patterns between the colors. The method can produce clustered dots at various cluster sizes and is not subject to the worm-like artifacts of error diffusion. The calculations required are fairly simple and can be carried out in parallel. Processing of the image can be done in any order, and in particular scan line order processing is supported.

It will no doubt be appreciated that the present invention may be accomplished with either software, hardware or combination software-hardware implementations. Additionally, it will be recognized that the invention has application in both standard and high addressability digital printing systems.

The invention has been described with reference to a particular embodiment. Modifications and alterations will occur to others upon reading and understanding this specification. It is intended that all such modifications and alterations are included insofar as they come within the scope of the appended claims or equivalents thereof.

I claim:

1. A printing system, including a processor preparing documents for printing, said documents including a set of image signals describing optical density with c density levels, while a destination printer is capable of rendering density with d density levels where c and d are integers greater than zero, comprising:

a printer, adapted to print the document;

a source of image signals each image signal representing optical density with one of c levels for a discrete area of the document indexed by pixel position x and scan line position y;

a halftone processor operatively connected to said source of image signals and reducing the number of levels c representing optical density to a number of levels d representing optical density including a first memory storing an ordered set of threshold values T, indexable by a length along a predetermined space filling curve;

a second memory storing a set of unexpanded space filling curve lengths mod M, where x and y are real numbers, indexed by pixel and scan line position;

a third memory storing a set of expanded space filling curve lengths Mod M, indexed by pixel and scan line position;

a fourth memory storing a set of direction indicators; direction transformation circuit determining modified x, y coordinates indicated by a direction indicator and corresponding to a change in orientation of a space filling curve, producing a pixel and scan line position indicator to the third memory;

a calculating circuit determining a threshold value T to be applied to a selected image signal x,y by adding the length mod M of the unexpanded portion of curve leading to the section containing the pixel to the indexed, direction-transformed expanded space filling curve length mod M to obtain a length L, number, for the selected image signal x,y, and using said value to index said first memory to retrieve $T(x,y)$, where $T(x,y)$ is the threshold value for a particular x, y position;

a comparator, comparing the image signal at position x,y with threshold value $T(x,y)$ to determine an output signal that is one of d levels representative of the original image signal at position x,y;

an image processor directing signals processed at said halftone processor to said printer to print said halftoned image.

2. The device as defined in claim 1, wherein the space filling curve is defined as a Hilbert curve.

3. The device as defined in claim 1, wherein c represents 256 levels of optical density.

4. The device as defined in claim 1, wherein d represents 2 levels of optical density.

5. An image processing system, preparing documents for printing, said documents including a set of image signals describing optical density with c density levels, while a destination printer is capable of rendering density with d density levels where c and d are integers greater than zero, comprising:

a source of image signals each image signal representing optical density with one of c levels for a discrete area of the document indexed by pixel position x and scan line position y, where x and y are real numbers;

a halftone processor operatively connected to said source of image signals and reducing the number of levels c representing optical density to a number of levels d representing optical density including a first memory storing an ordered set of thresholds T where T is a real number;

a calculating circuit determining a threshold value T to be applied to a selected image signal x,y, by determining length L, where L is a real number along the space filling curve for the image signal x,y, and using said length to determine a value for $T(x,y)$, where $T(x,y)$ is the threshold value for a particular x,y position indication $$T(x,y)=TL(x,y) \bmod M$$

where L and M are real numbers a comparator, comparing the image signal at position x,y with threshold value $T(x,y)$ to determine an output signal that is one of d levels representative of the original image signal at position x,y.

6. The device as defined in claim 5, wherein the space filling curve is defined as a Hilbert curve.

7. The device as defined in claim 5, wherein c represents 256 levels of optical density.

8. The device as defined in claim 5, wherein d represents 2 levels of optical density.

9. A method of halftoning image signals representing optical density with one of c levels for a discrete area of the document indexed by pixel position x and scan line position y, to reduce said signals to represent density with one of d levels, where c and d are integers greater than zero, and x and y are real numbers and including:

receiving image signals, each image signal representing optical density with one of c levels for a discrete area of the document indexed by pixel position x and scan line position y;

storing in a first memory an ordered set of threshold values T, where T is a real number, indexable by a length along a predetermined space filling curve;

storing in a second memory a set of unexpanded space filling curve lengths mod M, where M is a real number, indexed by pixel position and scan line position;

storing in a third memory a set of expanded space filling curve lengths Mod M, indexed by pixel position and scan line position;

storing in a fourth memory a set of direction indicators indexed by pixel position and scan line position;

determining modified pixel position and scan line position indicated by a direction indicator and corresponding to a change in orientation of a space filling curve, producing a pixel and scan line position indicator to the third memory;

determining a threshold value T to be applied to a selected image signal at position x,y by adding the length mod M of the unexpanded portion of curve leading to the section containing the pixel to the indexed, direction-transformed expanded space filling curve length mod M to obtain a length L where L is a real number, for the selected image signal x,y, and using said value to index said first memory to retrieve T(x,y), where T(x,y) is the threshold value for a particular x,y position indication;

comparing the image signal x,y with threshold value T(x,y) to determine an output signal that is one of d levels representative of the original image signal x,y;

directing signals processed to said printer to print said halftoned image.

10. A method of preparing documents for printing, said documents including a set of image signals describing optical density with c density levels, while a destination printer is capable of rendering density with d density levels where c and d are integers greater than zero, comprising:

receiving image signals representing optical density with one of c levels for a discrete area of the document indexed by pixel position x and scan line position y, where x and y are real numbers;

reducing the number of levels c representing optical density to a number of levels d representing optical density by:

for each image signal, calculating a first length along an unexpanded space filling curve as a function of pixel position x and scan line position y;

for each image signal, calculating a second length along an expanded space filling curve as a function of pixel position x and scan line position y;

adding said calculated first and second length together, to derive a curve length value;

using said curve length value mod M, where M is a real number as an index to a threshold memory, to obtain a prestored threshold value T(x,y) where T is a real number and T(x,y) is the threshold value for a particular x,y position;

comparing an image signal at x, y, with T(x,y) to determine an output value that is one of d levels.

* * * * *